United States Patent
Matsushita

(10) Patent No.: US 10,984,753 B2
(45) Date of Patent: Apr. 20, 2021

(54) IMAGE DISPLAY DEVICE AND IMAGE PROCESSING METHOD

(71) Applicant: NEC Display Solutions, Ltd., Tokyo (JP)

(72) Inventor: Hiroaki Matsushita, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/467,465

(22) PCT Filed: Dec. 14, 2016

(86) PCT No.: PCT/JP2016/087192
§ 371 (c)(1),
(2) Date: Jun. 6, 2019

(87) PCT Pub. No.: WO2018/109859
PCT Pub. Date: Jun. 21, 2018

(65) Prior Publication Data
US 2019/0318707 A1    Oct. 17, 2019

(51) Int. Cl.
G09G 5/18        (2006.01)
G06F 3/14        (2006.01)
H04N 1/32        (2006.01)
H04N 7/01        (2006.01)

(52) U.S. Cl.
CPC .............. *G09G 5/18* (2013.01); *G06F 3/1438* (2013.01); *H04N 1/32561* (2013.01); *H04N 7/0122* (2013.01)

(58) Field of Classification Search
None
See application file for complete search history.

(56) References Cited

U.S. PATENT DOCUMENTS

| | | | |
|---|---|---|---|
| 2009/0002551 A1* | 1/2009 | Yamamoto | H04N 7/0122 348/441 |
| 2012/0169852 A1* | 7/2012 | Seo | H04N 13/341 348/56 |
| 2015/0113411 A1* | 4/2015 | Underwood | G06F 3/0484 715/730 |

FOREIGN PATENT DOCUMENTS

| | | |
|---|---|---|
| JP | 2004-219726 A | 8/2004 |
| JP | 2009-014750 A | 1/2009 |
| JP | 2010-048974 A | 3/2010 |
| JP | 2011-180331 A | 9/2011 |
| JP | 2013-128247 A | 6/2013 |

OTHER PUBLICATIONS

International Search Report (ISR) (PCT Form PCT/ISA/210), in PCT/JP2016/087192, dated Mar. 21, 2017.

* cited by examiner

*Primary Examiner* — YuJang Tswei
(74) *Attorney, Agent, or Firm* — McGinn I.P. Law Group, PLLC.

(57) ABSTRACT

An image display device includes a plurality of signal input parts, a plurality of sub-controllers configured to process video signals from a plurality of signal input parts, and a controller configured to generate a display screen to be displayed on a display. The controller obtains the timing information for a video signal from the sub-controller based on the display information installed in advance.

16 Claims, 13 Drawing Sheets

FIG. 8A

DISPLAY SCREEN COUNT = 1

| DISPLAY SCREEN | INPUT CONNECTOR OF DISPLAY SCREEN |
|---|---|
| DISPLAY SCREEN G1 | SIGNAL INPUT CONNECTOR 21a |
| DISPLAY SCREEN G2 | |
| DISPLAY SCREEN G3 | |
| DISPLAY SCREEN G4 | |

FIG. 8B

| CONNECTOR | SUB-MICROCOMPUTER IMPLEMENTING RECEPTION PROCESS |
|---|---|
| SIGNAL INPUT CONNECTOR 21a | SUB-MICROCOMPUTER 12a |
| SIGNAL INPUT CONNECTOR 21f | SUB-MICROCOMPUTER 12b |
| SIGNAL INPUT CONNECTOR 21g | SUB-MICROCOMPUTER 12c |
| SIGNAL INPUT CONNECTOR 21j | SUB-MICROCOMPUTER 12d |

FIG. 10A

DISPLAY SCREEN COUNT = 4

| DISPLAY SCREEN | INPUT CONNECTOR OF DISPLAY SCREEN |
|---|---|
| DISPLAY SCREEN G1 | SIGNAL INPUT CONNECTOR 21a |
| DISPLAY SCREEN G2 | SIGNAL INPUT CONNECTOR 21a |
| DISPLAY SCREEN G3 | SIGNAL INPUT CONNECTOR 21a |
| DISPLAY SCREEN G4 | SIGNAL INPUT CONNECTOR 21a |

FIG. 10B

| CONNECTOR | SUB-MICROCOMPUTER IMPLEMENTING RECEPTION PROCESS |
|---|---|
| SIGNAL INPUT CONNECTOR 21a | SUB-MICROCOMPUTER 12a |
| SIGNAL INPUT CONNECTOR 21f | SUB-MICROCOMPUTER 12b |
| SIGNAL INPUT CONNECTOR 21g | SUB-MICROCOMPUTER 12c |
| SIGNAL INPUT CONNECTOR 21j | SUB-MICROCOMPUTER 12d |

IMAGE DISPLAY DEVICE AND IMAGE PROCESSING METHOD

TECHNICAL FIELD

The present invention relates to an image display device and an image processing method.

BACKGROUND ART

Image display devices having multiple functions (e.g. increasing numbers of input signals) have been inclined to increase the number of microcontrollers (hereinafter, referred to as microcomputers) and the number of devices. Other than main microcomputers (or main controllers) relating to the entire image processing, sub-microcomputers (or sub-controllers) configured to process input video signals are mounted on image display devices. In addition, various devices configured to carry out signal selecting processes and signal-format conversion are mounted on image display devices. The number of sub-microcomputers and the number of devices will be increased as the number of input signals are increased.

FIG. 13 is a block diagram showing an example of an image display device as a related art. An image display device 101 includes a single main microcomputer 111, two sub-microcomputers 112a, 112b, and two devices 113a, 113b. In addition, the image display device 101 is equipped with six signal input connectors 121a through 121f and a single external communication connector 122. In the image display device 101, the number of signal input connectors is "6"; the number of devices is "2"; and the number of microcomputers is "3". In another model in which the number of microcomputers is "10", the number of devices is "3" while the number of microcomputers is "6", wherein both the number of microcomputers and the number of devices will be increased as the number of input signals is increased.

Patent Document 1 discloses an image display device having a plurality of input terminals, which is designed to determine the presence/absence of image signals and to thereby switch over input terminals based on the result of determining the presence/absence of input signals applied to input terminals.

CITATION LIST

Patent Document

Patent Document 1: Japanese Patent Application No. 2011-180331

SUMMARY OF INVENTION

Technical Problem

As described above, image display devices having multiple functions are inclined to increase the number of microcomputers and the number of devices used therein. The increasing number of microcomputers (or controllers) and the increasing number of devices may increase the number of times to make communications for each unit time, thus increasing the processing time over the entire system. In addition, the increasing number of microcomputers (or controllers) and the increasing number of devices may need more time for microcomputers or devices to mutually receive or send information therebetween. This may increase the number of times to receive or send information for each unit time and thereby increase the processing time over the entire system.

Considering the aforementioned problem, the present invention aims to provide an image display device and an image processing method, which can reduce the startup process time irrespective of the increasing number of controllers such as microcomputers and which can reduce the time to carry out communication processes (e.g. processes of receiving or sending information) between microcomputers and between microcomputers and devices.

Solution to Problem

To solve the above problem, an image display device according to one aspect of the present invention includes a plurality of signal input parts, a plurality of sub-controllers configured to process video signals from a plurality of signal input parts, and a controller configured to generate a display screen to be displayed on a display. The controller obtains the timing information for a video signal from the sub-controller based on the display information installed in advance.

An image processing method according to one aspect of the present invention is applied to an image display device including a plurality of signal input parts, a plurality of sub-controllers configured to process video signals from a plurality of signal input parts, and a controller configured to generate a display screen to be displayed on a display. The image processing method includes a process of the controller configured to obtain the timing information of a video signal from the sub-controller based on the display information installed in advance.

Advantageous Effects of Invention

According to the present invention, it is possible to reduce the startup process time irrespective of the increasing number of microcomputers, and it is possible to reduce the time to carry out communication processes (e.g. processes of receiving or sending information) between microcomputers or between microcomputers and devices.

BRIEF DESCRIPTION OF DRAWINGS

FIG. 8A is an explanatory diagram showing an example of display information.

FIG. 8B is an explanatory diagram showing an example of display information.

FIG. 10A is an explanatory diagram showing another example of display information.

FIG. 10B is an explanatory diagram showing another example of display information.

DESCRIPTION OF EMBODIMENT

Figure 1:
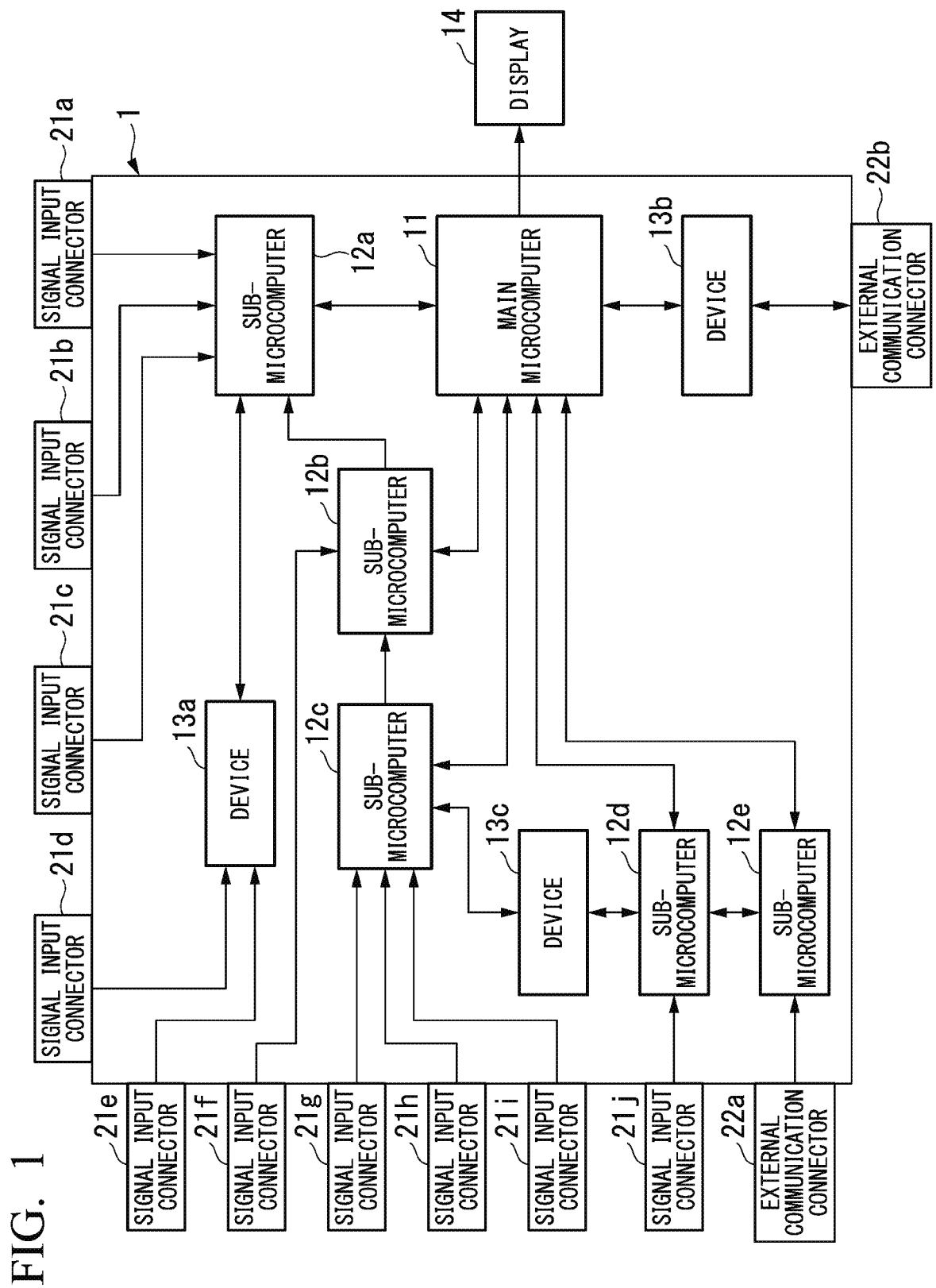
FIG. 1 is a block diagram showing the configuration of an image display device according to the first embodiment of the present invention.

Hereinafter, the present invention will be described with respect to the embodiments with reference to the drawings. FIG. 1 is a block diagram showing the configuration of an image display device 1 according to the first embodiment of the present invention. As shown in FIG. 1, the image display device 1 of the present embodiment includes a main microcomputer 11 (e.g. a controller), sub-microcomputers 12a through 12e (e.g. a sub-controller), and devices 13a through 13c. In addition, the image display device 1 is equipped with signal input connectors 21a through 21j (e.g. signal input parts) and external communication connectors 22a, 22b. For example, signal input connectors are connectors for HDMI (trademark registration), Displayport, VGA, DVI, VIDEO, USB, LAN, and PC.

The main microcomputer 11 achieves the function of a main controller of the image display device 1. The main microcomputer 11 is configured to carry out communications (e.g. processes of receiving or sending information) with the sub-microcomputers 12a through 12e and to communicate (or to receive or send information) with the device 13b. Due to those communications, the main microcomputer 11 may acquire necessary information from the sub-microcomputers 12a through 12e and from the device 13b. The main microcomputer 11 carries out its processes according to information to display a video on a display 14.

The sub-microcomputers 12a through 12e achieve the function of a sub-controller for the image display device 1. The sub-microcomputer 12a carries out a reception process to receive video signals from the signal input connectors 21a through 21c and video signals from the signal input connector 21d or 21e, which is selected by the device 13a. When video signals are input to the signal input connectors 21a through 21c, the sub-microcomputer 12a carries out a measurement process on video signals from the signal input connectors 21a through 21c to acquire the timing information of video signals from the signal input connectors 21a through 21c. The timing information of video signals represents signal statuses (Signal Status; whether or not to employ interlacing, whether to employ RGB or YUV), horizontal and vertical frequencies, polarities of horizontal or vertical signals, vertical positions, horizontal positions, color formats, and video formats. Color formats may include at least one of NTSC 3.85 MHz, PAL, SECAM, NTSC 4.43 MHz, PAL-M, PAL-N, and PAL-60 Hz. Of course, color formats may include multiple formats among them. Video formats may include at least one of 480i, 576i, 480P, 576P, 720P, 1080i, and 1080P. Of course, video formats may include multiple formats among them. When a video signal is input to the signal input connector 21d or 21e, the sub-microcomputer 12a carries out a measurement process on the video signal from the signal input connector 21d or 21e, which is selected by the device 13a, and thereby acquire the timing information of the video signal from the signal input connector 21d or 21e. Subsequently, the sub-microcomputer 12a sends to the main microcomputer 11 the timing information of video signals from the signal input connectors 21a through 21c and the timing information of a video signal from the signal input connector 21d or 21e. The sub-microcomputer 12a communicates (to receive or send information) with the sub-microcomputer 12b.

The sub-microcomputer 12b is configured to process a video signal from the signal input connector 21f. When a video signal is input to the signal input connector 21f, the sub-microcomputer 12b carries out a measurement process on the video signal from the signal input connector 21f and thereby acquires the timing information of the video signal from the signal input connector 21f. Subsequently, the sub-microcomputer 12b sends the timing information of the video signal from the signal input connector 21f. In addition, the sub-microcomputer 12b communicates (to receive or send information) with the sub-microcomputer 12a and the sub-microcomputer 12c. The sub-microcomputer 12b carries out a path-selecting process in addition to the reception process to receive the video signal from the signal input connector 21f.

The sub-microcomputer 12c carries out the reception process to receive video signals from the signal input connectors 21g through 21i. When video signals are input to the signal input connectors 21g through 21i, the sub-microcomputer 12c carries out a measurement process on the video signals from the signal input connectors 21g through 21i and thereby acquires the timing information of the video signals from the signal input connectors 21g through 21i. Subsequently, the sub-microcomputer 12c sends the timing information of the video signals from the signal input connectors 21g through 21i to the main microcomputer 11. In addition, the sub-microcomputer 12c communicates (to send or receive information) with the sub-microcomputer 12b. In addition, the sub-microcomputer 12c communicates (to receive or send information) with the device 13c. The sub-microcomputer 12c carries out a path-selecting process in addition to the reception process to receive the video signals from the signal input connectors 21g through 21i.

The sub-microcomputer 12d carries out a reception process to receive a video signal from the signal input connector 21j. When a video signal is input to the signal input connector 21j, the sub-microcomputer 12d carries out a measurement process on the video signal from the signal input connector 21j and thereby acquires the timing information of the video signal from the signal input connector 21j. Subsequently, the sub-microcomputer 12d sends the timing information of the video signal from the signal input connector 21j to the main microcomputer 11. In addition, the sub-microcomputer 12d communicates (to receive or send information) with the sub-microcomputer 12e. Moreover, the sub-microcomputer 12d communicates (to receive or send information) with the device 13c.

The sub-microcomputer 12e carries out the data processing for data from the external communication connector 22a. When data is input to the external communication connector 22a, the sub-microcomputer 12e carries out a data-input process on the data from the external communication network 22a. Subsequently, the sub-microcomputer 12e sends the data from the external communication connector 22a to the main microcomputer 11. In addition, the sub-microcomputer 12e communicates (to receive or send information) with the sub-microcomputer 12d.

The device 13a carries out a signal-selecting process on an input video signal from the signal input connector 21d and an input video signal from the signal input connector 21e, thus sending the selected video signal to the sub-microcomputer 12a.

The device 13b carries out a reception process to receive the input data from the external communication connector 22b and thereby sends the input data to the main microcomputer 11.

The device 13c carries out a format conversion process on the video signal from the sub-microcomputer 12c or the sub-microcomputer 12d.

Figure 2A:
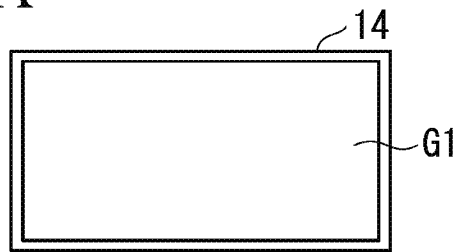
FIG. 2A is an explanatory diagram showing a display screen of a display.
Figure 2B:
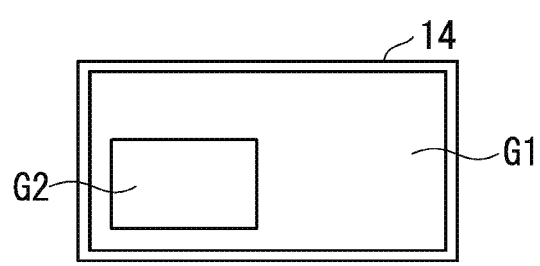
FIG. 2B is an explanatory diagram showing a display screen of a display.
Figure 2C:
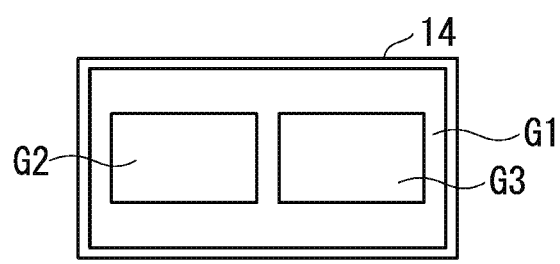
FIG. 2C is an explanatory diagram showing a display screen of a display.
Figure 2D:
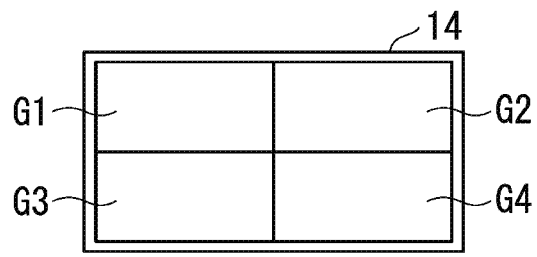
FIG. 2D is an explanatory diagram showing a display screen of a display.

As described above, the image display device 1 according to the first embodiment of the present invention includes a plurality of signal input connectors 21a through 21j, whereby the display 14 may concurrently show a plurality of screens by way of PinP (Picture in Picture) or PbyP (Picture by Picture). FIGS. 2A through 2D show various types of display screens on the display 14. FIG. 2A shows an example in which a single display screen G1 is shown in the entirety of the display 14. FIG. 2B shows an example in which two display screens G1 and G2 are shown on the display 14 by way of PinP. FIG. 2 shows an example in which three display screens G1, G2, and G3 are shown on the display 14 by way of PinP. FIG. 2D shows an example in which four display screens G1, G2, G3, and G4 are shown on the display 14 by way of PbyP.

To achieve a single-screen presentation, a PinP and/or PbyP presentation (i.e. a concurrent multi-screen presentation), for example, the image display device 1 according to the first embodiment of the present invention includes the main microcomputer 11 having four screen-information holding areas.

[0024]

Figure 3:
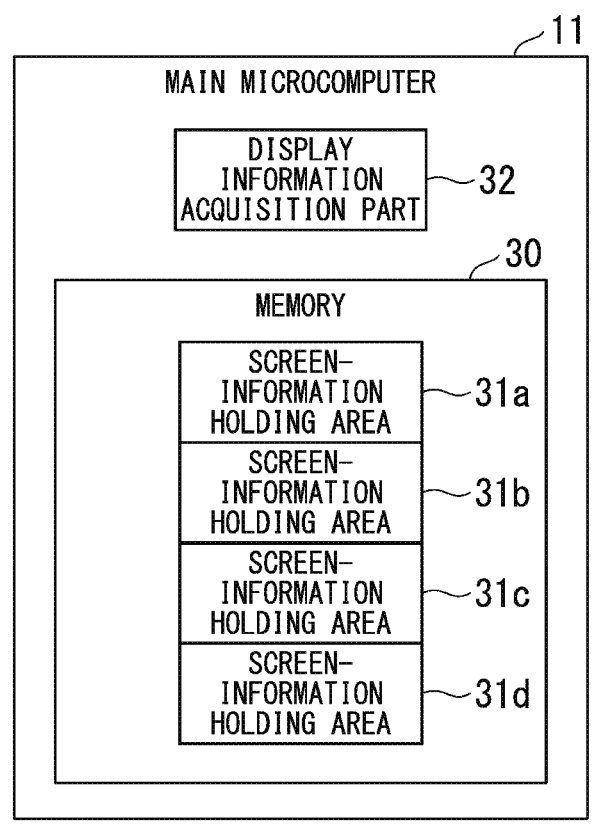
FIG. 3 is a block diagram showing a schematic configuration of a main microcomputer.

FIG. 3 is a block diagram showing the schematic configuration of the main microcomputer 11. As shown in FIG. 3, for example, the main microcomputer 11 includes a memory 30 having four screen-information holding areas 31a, 31b, 31c, and 31d. The screen-information holding area 31a is configured to store the timing information of a video signal used to show the display screen G1 as shown in FIGS. 2A to 2D. The screen-information holding area 31b is configured to store the timing information of a video signal used to show the display screen G2 as shown in FIGS. 2B to 2D. The screen-information holding area 31c is configured to store the timing information of a video signal used to show the display screen G3 as shown in FIGS. 2C to 2D. The screen-information holding area 31d is configured to store the timing information of a video signal used to show the display screen G4 as shown in FIG. 2D.

The main microcomputer 11 of the image display device 1 according to the first embodiment of the present invention further includes a display information acquisition part 32. The display information acquisition part 32 is configured to store the display information including at least the number of display screens and the information relating to signal input connectors correlated to each display screen. The display information may further include the correlation information between signal input connectors and sub-microcomputers to carry out a reception process to receive video signals from signal input connectors. Herein, the information of signal input connectors is the information indicating which input signal from its signal input connector should be used to show a display screen, i.e. the display screen and its corresponding connector information. In addition, it is possible for a user to set the display information in an OSD (On-Screen Display) menu.

Figure 4:
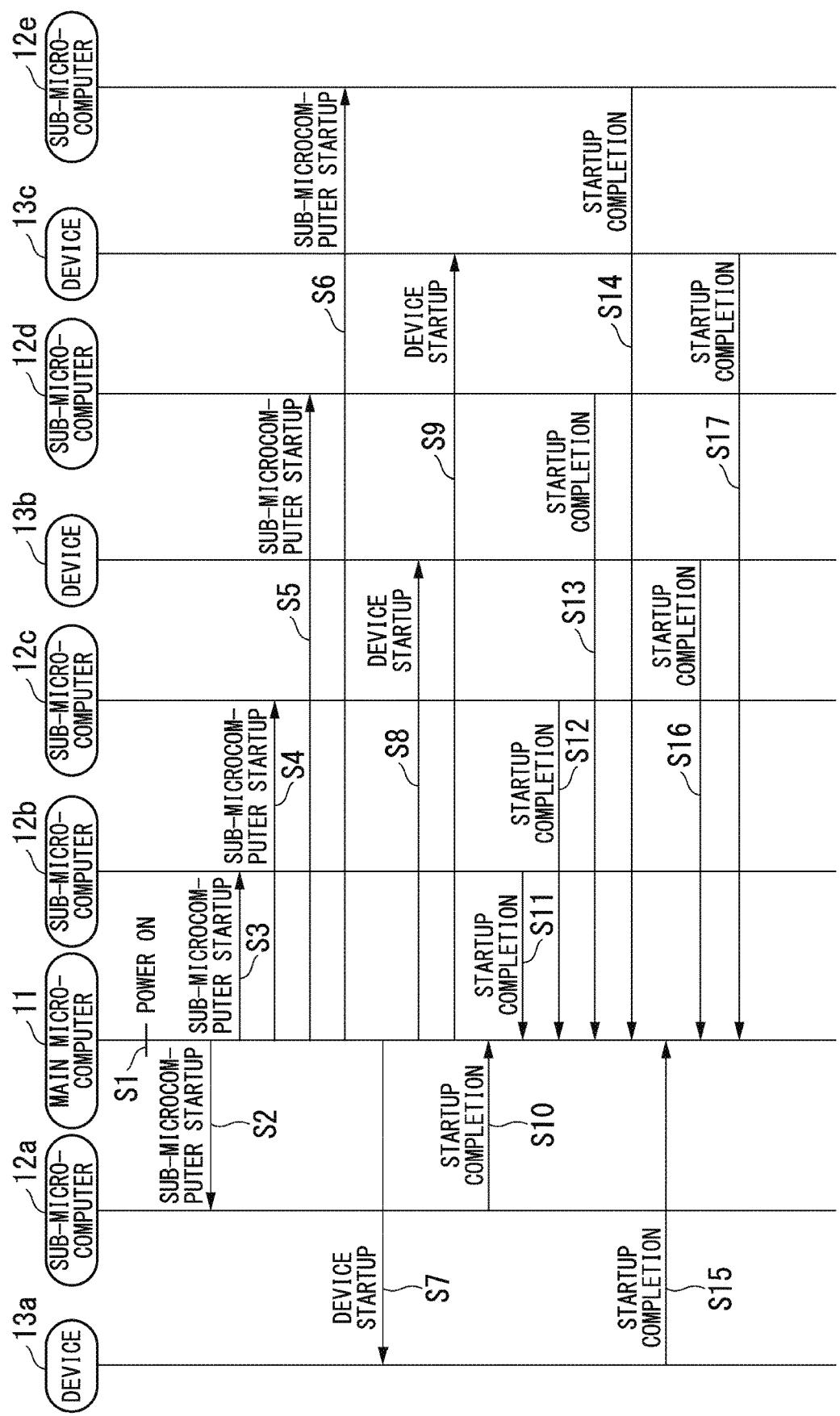
FIG. 4 is a sequence diagram showing startup processes for each microcomputer and for each device in the image display device according to the first embodiment of the present invention.

Next, an image display process will be described with respect to the image display device 1 according to the first embodiment of the present invention. FIG. 4 is a sequence diagram showing startup processes for each microcomputer and for each device in the image display device 1 according to the first embodiment of the present invention.

The main microcomputer 11 starts to operate upon applying power to the image display device 1. In FIG. 4, when the main microcomputer 11 starts to operate (due to a power-on event) (step S1), the main microcomputer 11 sends a startup instruction to the sub-microcomputer 12a (step S2). The step S2 may be implemented after the image display device 1 is reset to its initial state (or after resetting) in addition to the timing of applying power to the image display device 1. Next, the main microcomputer 11 sends a startup instruction to the sub-microcomputer 12b (step S3). The main microcomputer 11 sends a startup instruction to the sub-microcomputer 12c (step S4). The main microcomputer 11 sends a startup instruction to the sub-microcomputer 12d (step S5). The main microcomputer 11 sends a startup instruction to the sub-microcomputer 12e (step S6). In addition, the main microcomputer 11 sends a startup instruction to the device 13a (step S7). The main microcomputer 11 sends a startup instruction to the device 13b (step S8). The main microcomputer 11 sends a startup instruction to the device 13c (step S9).

Upon completion of a startup process, the sub-microcomputer 12a sends a startup-completion notification to the main microcomputer 11 (step S10). Upon completion of a startup process, the sub-microcomputer 12b sends a startup-completion notification to the main microcomputer 11 (step S11). Upon completion of a startup process, the sub-microcomputer 12c sends a startup-completion notification to the main microcomputer 11 (step S12). Upon completion of a startup process, the sub-microcomputer 12d sends a startup-completion notification to the main microcomputer 11 (step S13). Upon completion of a startup process, the sub-microcomputer 12e sends a startup-completion notification to the main microcomputer 11 (step S14). In addition, upon completion of a startup process, the device 13a sends a startup-completion notification to the main microcomputer 11 (step S15). Upon completion of a startup process, the device 13b sends a startup-completion notification to the main microcomputer 11 (step S16). Upon completion of a startup process, the device 13c sends a startup-completion instruction to the main microcomputer (step S17). Thereafter, the image display device 1 carries out a video information acquisition process.

Figure 5:
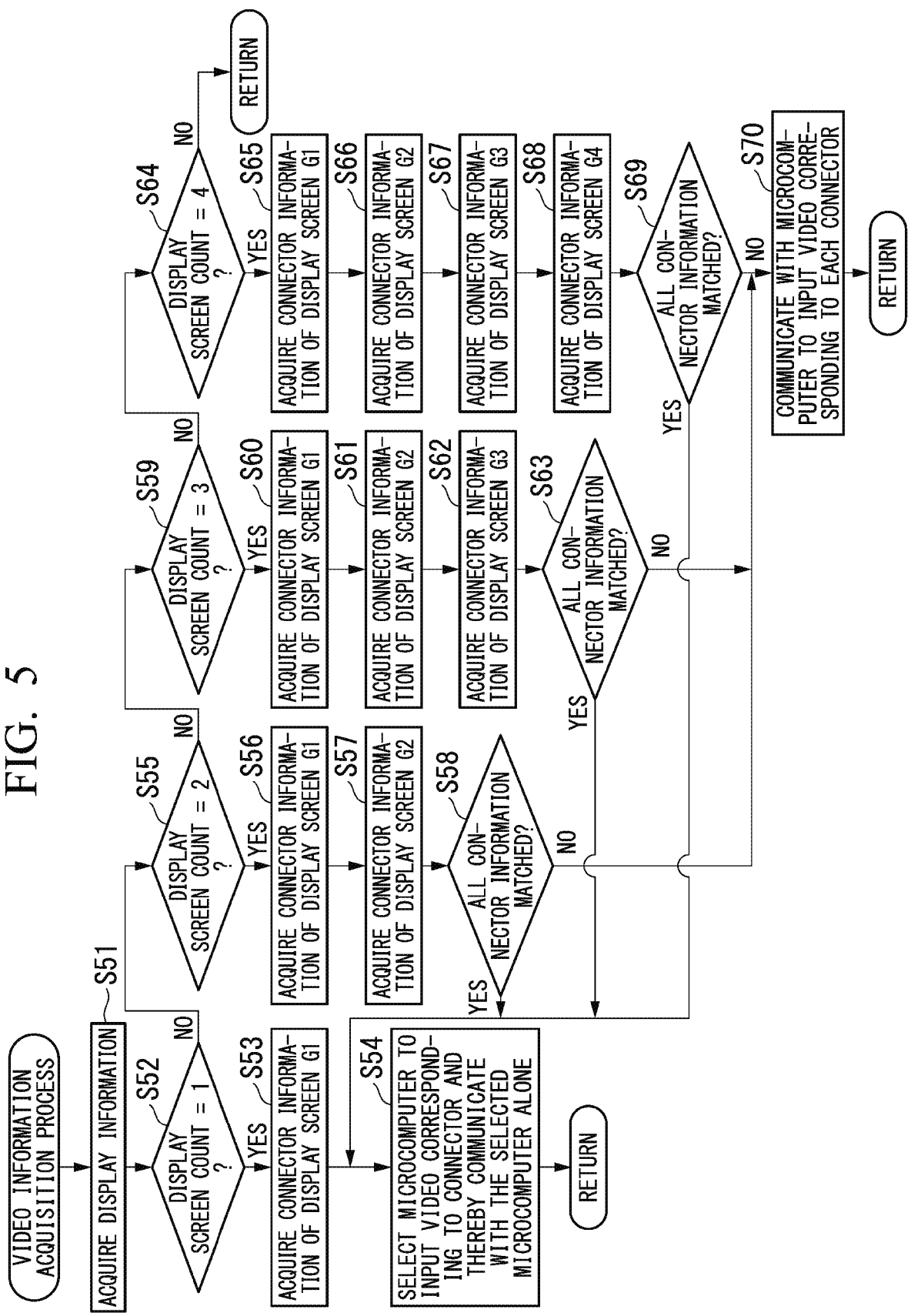
FIG. 5 is a flowchart showing a video information acquisition process in the image display device according to the first embodiment of the present invention.

FIG. 5 is a flowchart showing a video information acquisition process of the image display device 1 according to the first embodiment of the present invention.

In FIG. 5, the main microcomputer 11 acquires the display information from the display information acquisition part 32 (step S51) and thereby determines whether or not the display screen count is set to "1" (step S52).

Upon determining that the display screen count is "1" in step S52 (step S52: YES), the main microcomputer 11 acquires the input connector information for the display screen G1 from the display information of the display information acquisition part 32 (step S53). The input connector information is the information as to which connector should be selected to use its input signal for the purpose of showing the display screen G1. The main microcomputer 11 selects a microcomputer corresponding to the input connector information and thereby communicates with the selected microcomputer (step S54).

Upon determining that the display screen count is not equal to "1" in step S52 (step S52: NO), the main microcomputer 11 determines whether or not the display screen count is "2" (step S55).

Upon determining that the display screen count is equal to "2" in step 55 (step S55: YES), the main microcomputer 11 acquires the input connector information for inputting a video signal to be displayed on the display screen G1 (step S56) and then acquires the input connector information for inputting a video signal to be displayed on the display screen G2 (step S57). Subsequently, the main microcomputer 11 determines whether or not the input connector information of the display screen G1 matches the input connector information of the display screen G2 (step S58).

Upon determining that the input connector information of the display screen G1 matches the input connector information of the display screen G2 (step S58: YES), the main microcomputer 11 returns the flow to step S54. Subsequently, the main microcomputer 11 selects a microcomputer corresponding to the input connector information of the display screen G1 based on the display information of the display information acquisition part 32 and thereby communicates with the selected microcomputer (step S54).

Upon determining that the display screen count is not equal to "2" in step S55 (step S55: NO), the main microcomputer 11 determines whether or not the display screen count is set to "3" (step S59).

Upon determining that the display screen count is equal to "3" in step S59 (step S59: YES), the main microcomputer 11 acquires the input connector information for inputting a video signal to be displayed on the display screen G1 (step S60). The main microcomputer 11 acquires the input connector information for inputting a video signal to be displayed on the display screen G2 (step S61). The main microcomputer 11 acquires the input connector information for inputting a video signal to be displayed on the display screen G3 (step S62). Subsequently, the main microcomputer 11 determines whether or not all the input connector information of the display screen G1, the input connector information of the display screen G2, the input connector information of the display screen G3 match each other (step S63).

Upon determining that all the input connector information of the display screen G1, the input connector information of the display screen G2, and the input connector information of the display screen G3 match each other (step S63: YES), the main microcomputer 11 returns the flow to step S54. Subsequently, the main microcomputer 11 selects a microcomputer corresponding to the input connector information of the display screen G1 based on the display information of the display information acquisition part 32 and thereby communicates with the selected microcomputer (step S54).

Upon determining that the display screen count is not equal to "3" in step S59 (step S59: NO), the main microcomputer 11 determines whether or not the display screen count is equal to "4" (step S64).

Upon determining that the display screen count is equal to "4" in step S64 (step S64: YES), the main microcomputer 11 acquires the input connector information for inputting a video signal to be displayed on the display screen G1 (step S65). The main microcomputer 11 acquires the input connector information for inputting a video signal to be displayed on the display screen G2 (step S66). The main microcomputer 11 acquires the input connector information for inputting a video signal to be displayed on the display screen G3 (step S67). The main microcomputer 11 acquires the input connector information for inputting a video signal to be displayed on the display screen G4 (step S68). Subsequently, the main microcomputer 11 determines whether or not all the input connector information of the display screen G1, the input connector information of the display screen G2, the input connector information of the display screen G3, and the input connector information of the display screen G4 match each other (step S69).

Upon determining that all the input connector information of the display screen G1, the input connector information of the display screen G2, the input connector information of the display screen G3, and the input connector information of the display screen G4 match each other match each other (step S69: YES), the main microcomputer 11 returns the flow to step S54. That is, the main microcomputer 11 selects a microcomputer corresponding to the input connector information of the display screen G1 from the display information of the display information acquisition part 32 and thereby communicates with the selected microcomputer (step S54).

Upon determining that a plurality of input connector information do not match each other in steps S58, S63, and S69, the main microcomputer 11 communicates with a microcomputer for inputting a video corresponding to each connector (step S70).

Figure 6:
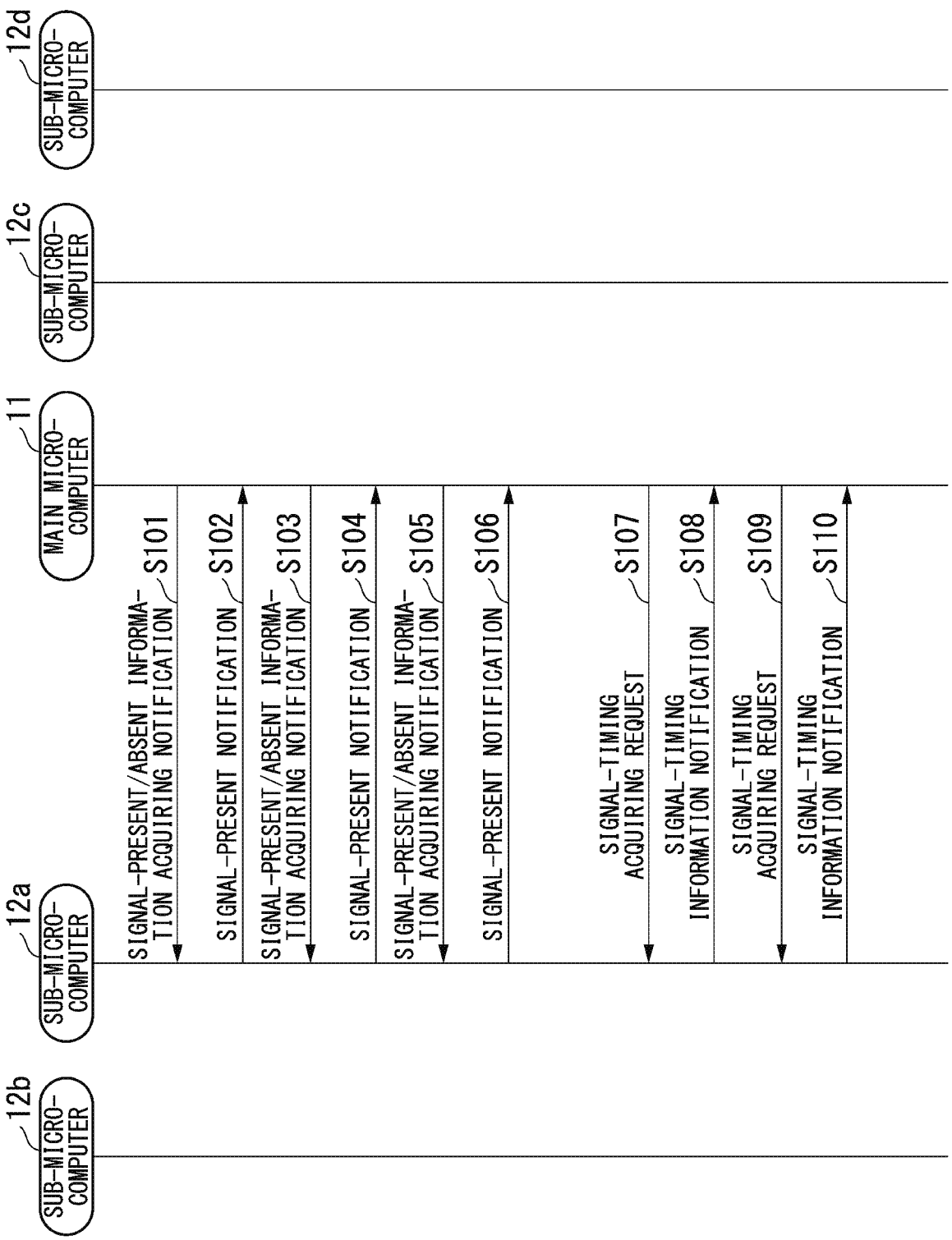
FIG. 6 is a sequence diagram showing a microcomputer communication process in the image display device according to the first embodiment of the present invention.

FIG. 6 is a sequence diagram showing a microcomputer communication process of step S54 in FIG. 5.

In FIG. 6, the main microcomputer 11 notifies the sub-microcomputer 12a of a first signal-present/absent information acquiring notification (step S101). Herein, the signal-present/absent information acquiring notification is an instruction configured to instruct a sub-microcomputer to notify a main microcomputer of a decision as to whether or not a video signal is input to a signal input connector.

Upon receiving the first signal-present/absent information acquiring notification, the sub-microcomputer 12a sends back signal-present information to the main microcomputer 11 (step S102). The main microcomputer 11 notifies the sub-microcomputer 12a of a second signal-present/absent information acquiring notification (step S103). Upon receiving the second signal-present/absent information acquiring notification, the sub-microcomputer 12a sends back signal-present information to the main microcomputer 11 (step S104). The main microcomputer 11 notifies the sub-microcomputer 12a of a third signal-present/absent information acquiring notification (step S105). Upon receiving the third signal-present/absent information acquiring information, the sub-microcomputer 12a sends back signal-present information to the main microcomputer 11 (step S106).

Upon consecutively receiving the signal-present information from the sub-microcomputer 12a three times, the main microcomputer 11 is able to determine the presence of a signal from the sub-microcomputer 12a. Subsequently, the main microcomputer 11 notifies the sub-microcomputer 12a of a first signal-timing acquiring request (step S107). Upon receiving the first signal-timing acquiring request, the sub-microcomputer 12a sends back the timing information of a video signal to the main microcomputer 11 (step S108). The main microcomputer 11 notifies the sub-microcomputer 12a of a second signal-timing acquiring request (step S109). Upon receiving the second signal-timing acquiring request, the sub-microcomputer 12a sends back the timing information of a video signal to the main microcomputer 11 (step S110). Accordingly, the timing information of a video signal is recorded on the screen-information holding area 31a.

Figure 7:
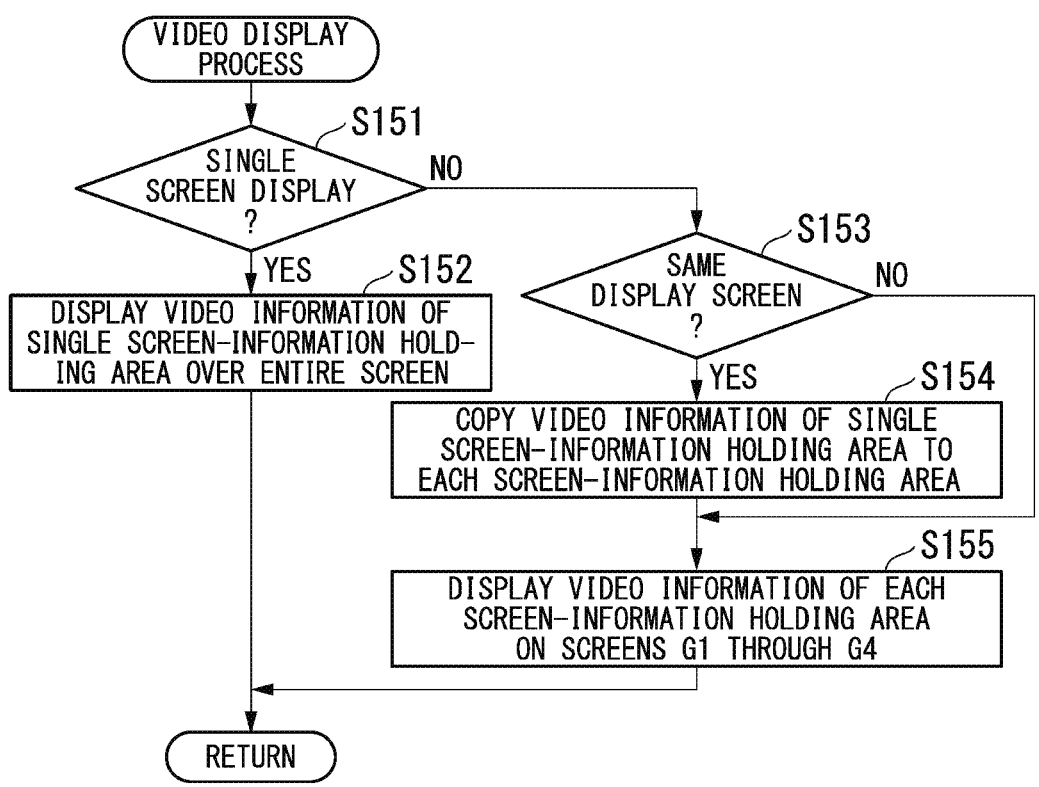
FIG. 7 is a flowchart showing a video display process in the image display device according to the first embodiment of the present invention.

FIG. 7 is a flowchart showing a video display process in the image display device 1 according to the first embodiment of the present invention.

The main microcomputer 11 determines whether or not the display screen count is set to "1" (step S151). When the display screen count is equal to "1" (step S151: YES), the main microcomputer 11 displays the display screen G1 over the entire surface of the display 14 based on the timing information of a video signal held by a single screen-information holding area 31a (step S152).

When the display screen count is not equal to "1" (step S151: NO), the main microcomputer 11 determines whether or not the same screen will be displayed on the display 14 (step S153). When the same screen will be displayed on the display 14 (step S153: YES), the main microcomputer 11 copies the timing information of a video signal, which is held (or stored) in a single screen-information holding area 31a (or a firs screen-information holding area) to other screen-information holding areas 31b through 31d (or a screen-information holding area corresponding to another display screen) (step S154). Subsequently, the main microcomputer 11 displays images on the display screens G1 through G4 of the display 14 based on the timing information of video signals held in the screen-information holding areas 31a through 31d (step S155). When the same screen will not be displayed on the display 14 (step S153: NO), the main microcomputer 11 displays images on the display screens G1 through G4 of the display 14 based on the timing information of video signals held in the screen-information holding areas 31a through 31d (step S155).

As shown in FIG. 1, the image display device 1 according to the first embodiment of the present invention includes five sub-microcomputers 12a through 12e and three devices 13a through 13c. To obtain the timing information of video signals from all the sub-microcomputers 12a through 12e and the devices 13a through 13c in this configuration, it is necessary to carry out plenty of steps for processing, e.g. steps S1 through S17. In particular, when one of sub-microcomputers 12a through 12e requires a long time to start up its operation, a problem may arise in that a total startup time will become very long with respect to an image display process to be carried out upon waiting for all the information from the sub-microcomputers 12a through 12e.

According to the first embodiment of the present invention as shown in FIG. 5, the main microcomputer 11 is configured to select a video input upon acquiring the display information and thereby obtains the timing information of a video signal from a sub-microcomputer subjected to a reception process to receive the selected video signal. Accordingly, it is possible to reduce the amount of communications between microcomputers, and it is possible to reduce a period of time from the timing to start up the image display device 1 to the timing to display its screen.

According to the first embodiment of the present invention as shown in FIG. 5 including a plurality of display screens, the main microcomputer 11 determines whether all the input connector information of display screens match each other, and therefore the main microcomputer 11 communicates with a sub-microcomputer subjected to a reception process to receive a single video signal when all the input connector information of display screens match each other. As shown in FIG. 7, the information held in a single screen-information holding area 31a is copied to other screen-information holding areas 31b through 31d. Accordingly, it is possible to reduce the loads imparted to the entire system processing, and therefore it is possible to achieve a high-speed operation over the entire system. This feature will be described below.

First, a concrete example of a display process will be described with respect to the display screen count equal to "1". Herein, it is assumed that a video signal from the signal input connector 21a will be displayed over the entire surface of the display 14. In addition, a video input is connected to each of the signal input connector 21a, the signal input connector 21f, the signal input connector 21g, and the signal input connector 21j. In this case, two sets of display information as shown in FIGS. 8A and 8B are held by the display information acquisition part 32.

FIG. 8A shows that the display screen count is set to "1" while the signal input connector 21a is used to input a video signal to be displayed on the display screen G1. In addition, FIG. 8B shows that the sub-microcomputer 12a is regarded as a microcomputer subjected to a reception process with the signal input connector 21a; the sub-microcomputer 12b is regarded as a microcomputer subjected to a reception process with the signal input connector 21f; the sub-microcomputer 12c is regarded as a microcomputer subjected to a reception process with the signal input connector 21g; and the sub-microcomputer 12d is regarded as a microcomputer subjected to a reception process with the signal input connector 21j.

In the video information acquisition process shown in FIG. 5, the main microcomputer 11 determines the display screen count. In this example in which the display screen count is equal to "1", the main microcomputer 11 acquires the information about a signal input connector for the display screen G1 based on the information shown in FIG. 8A, selects a sub-microcomputer corresponding to the signal input connector based on the information shown in FIG. 8B, and thereby communicates with the sub-microcomputer. In this example, it is determined that the signal input connector 21a corresponds to a signal input connector for inputting a video signal of the display screen G1 based on the information of FIG. 8A, and it is determined that the sub-microcomputer 12a corresponds to the signal input connector 21a based on the information of FIG. 8B. Accordingly, the main microcomputer 11 communicates with the sub-microcomputer 12a to obtain the timing information of a video signal. However, the main microcomputer 11 does not obtain the timing information of video signals from other sub-microcomputers.

Accordingly, it is possible to reduce the total time from the startup timing to the screen display timing. In this connection, the main microcomputer 11 and the sub-microcomputer 12a carry out a communication process including ten steps, i.e. steps S101 through S110 shown in FIG. 6.

When the main microcomputer 11 communicates with all the four sub-microcomputers 12a through 12d with respect to a video process, it is necessary to repeat a series of steps S101 through S110 four times; hence, the communication process conducted between the main microcomputer 11 and the sub-microcomputer 12a may include forty steps in total. This may increase the number of times to carry out communications for each unit time, thus increasing the total processing time for the entire system.

As described above, it is possible for the present embodiment to reduce the fixed-cycle communication time to (1/N) (where N indicates the total screen count, e.g. "4" in this example). Accordingly, it is possible to reduce the total time from the power-on timing to the timing to complete a startup process, and therefore it is possible to reduce the number of times to carry out communications for each unit time, thus reducing the total processing time for the entire system. In addition, it is possible to save power by reducing communication processes for each microcomputer and for each device.

Figure 9:
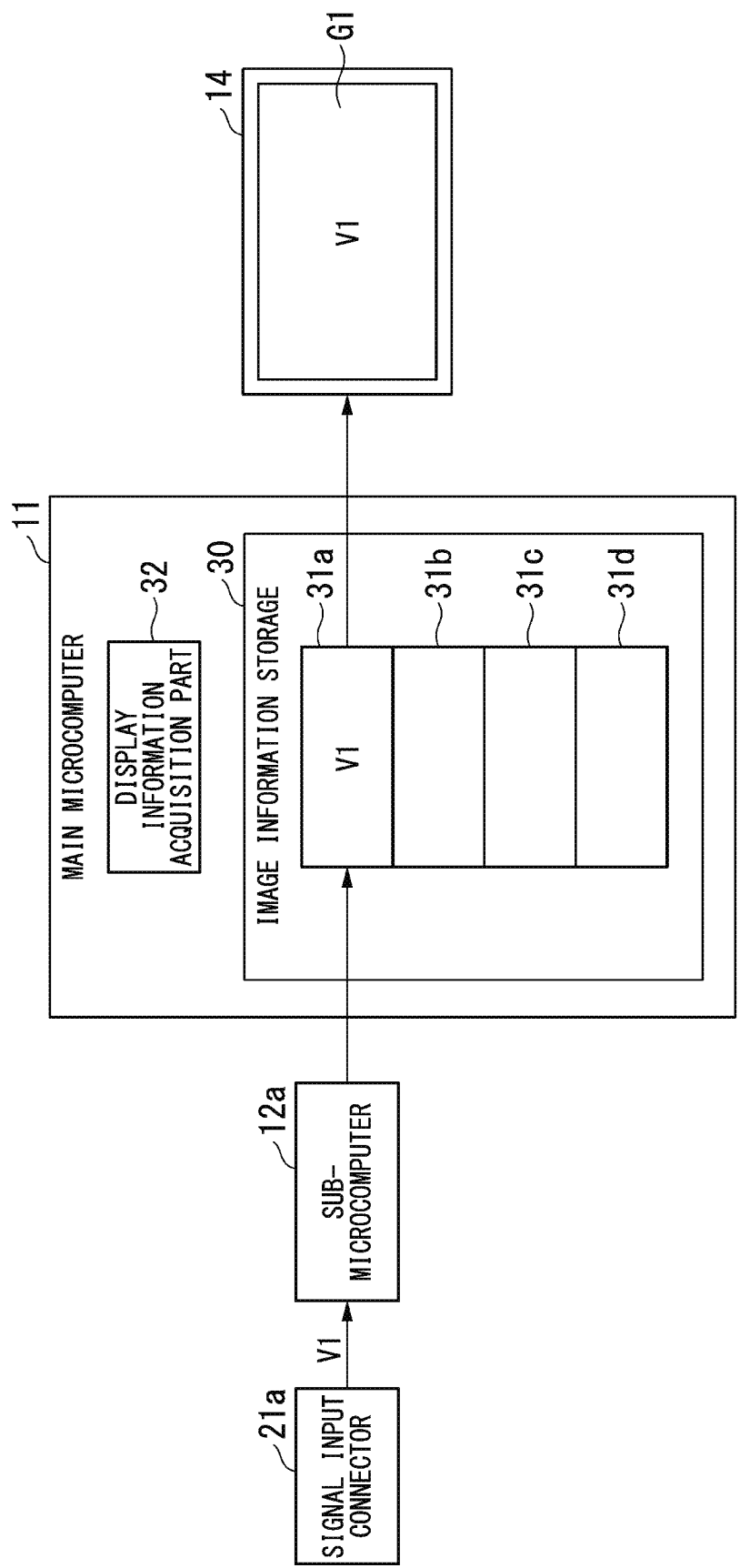
FIG. 9 is an explanatory diagram showing an example of processing of a main microcomputer.

FIG. 9 is an explanatory diagram of the processing of the main microcomputer 11 according to the above example. As shown in FIG. 9, the main microcomputer 11 communicates with the sub-microcomputer 12a. The sub-microcomputer 12a carries out a reception process with the signal input connector 21a and therefore sends timing information V1 for a video signal from the signal input connector 21a to the main microcomputer 11. The main microcomputer 11 holds the timing information V1 for a video signal from the signal input connector 221a in the screen-information holding area 31a and therefore displays an image corresponding to the video signal from the signal input connector 21a on the entire screen of the display 14.

Next, a concrete example of a display process adapted to the situation in which the display screen count is equal to "4" while the same signal input connector is used to display screens will be described as another example of a display process of the image display device 1 according to the first embodiment of the present invention. Herein, it is assumed that a video signal from the signal input connector 21a is divided into four signals to be displayed on the display 14 by way of PinP. In addition, it is assumed that a video input is connected to each of the signal input connector 21a, the signal input connector 21f, the signal input connector 21g, and the signal input connector 21j. In addition, it is assumed that the display information acquisition part 32 holds a set of display information shown in FIGS. 10A and 10B.

In the example shown in FIG. 10A, the display screen count is equal to "4" while the signal input connector 21a is used to input all the video signals to be displayed on the display screens G1 through G4. As shown in FIG. 10B, the sub-microcomputer 12a is regarded as a microcomputer subjected to a reception process with the signal input connector 21a; the sub-microcomputer 12b is regarded as a microcomputer subjected to a reception process with the signal input connector 21f; the sub-microcomputer 12c is regarded as a microcomputer subjected to a reception process with the signal input connector 21g; and the sub-microcomputer 12d is regarded as a microcomputer subjected to a reception process with the signal input connector 21j.

At first, the main microcomputer 11 determines the display screen count. In this example in which the display screen count is equal to "4", the main microcomputer 11 obtains the input connector information of the display screen G1, the input connector information of the display screen G2, the input connector information of the display screen G3, and the input connector information of the display screen G4 based on the information shown in FIG. 10A. When all the input connector information of the display screen G1, the input connector information of the display screen G2, the input connector information of the display screen G3, and the input connector information of the display screen G4 match each other, the main microcomputer 11 selects a sub-microcomputer corresponding to a signal input connector for displaying the display screen G1 based on the information shown in FIG. 10B and therefore communicates with the selected sub-microcomputer. In this example, it is determined that the signal input connector 21a corresponds to all the signal input connectors for displaying the display screens G1 through G4 based on the information of FIG. 10A, while it is determined that the sub-microcomputer 12a is regarded as a sub-microcomputer corresponding to the signal input connector 21a based on the information of FIG. 10B. Accordingly, the main microcomputer 11 communicates with the sub-microcomputer 12a and thereby obtains the timing information of a video signal.

Accordingly, it is possible to reduce the total time from the startup timing to the screen display timing. In addition, the main microcomputer 11 and the sub-microcomputer 12a carry out a communication process via steps S101 through S110 in FIG. 6.

Figure 11:
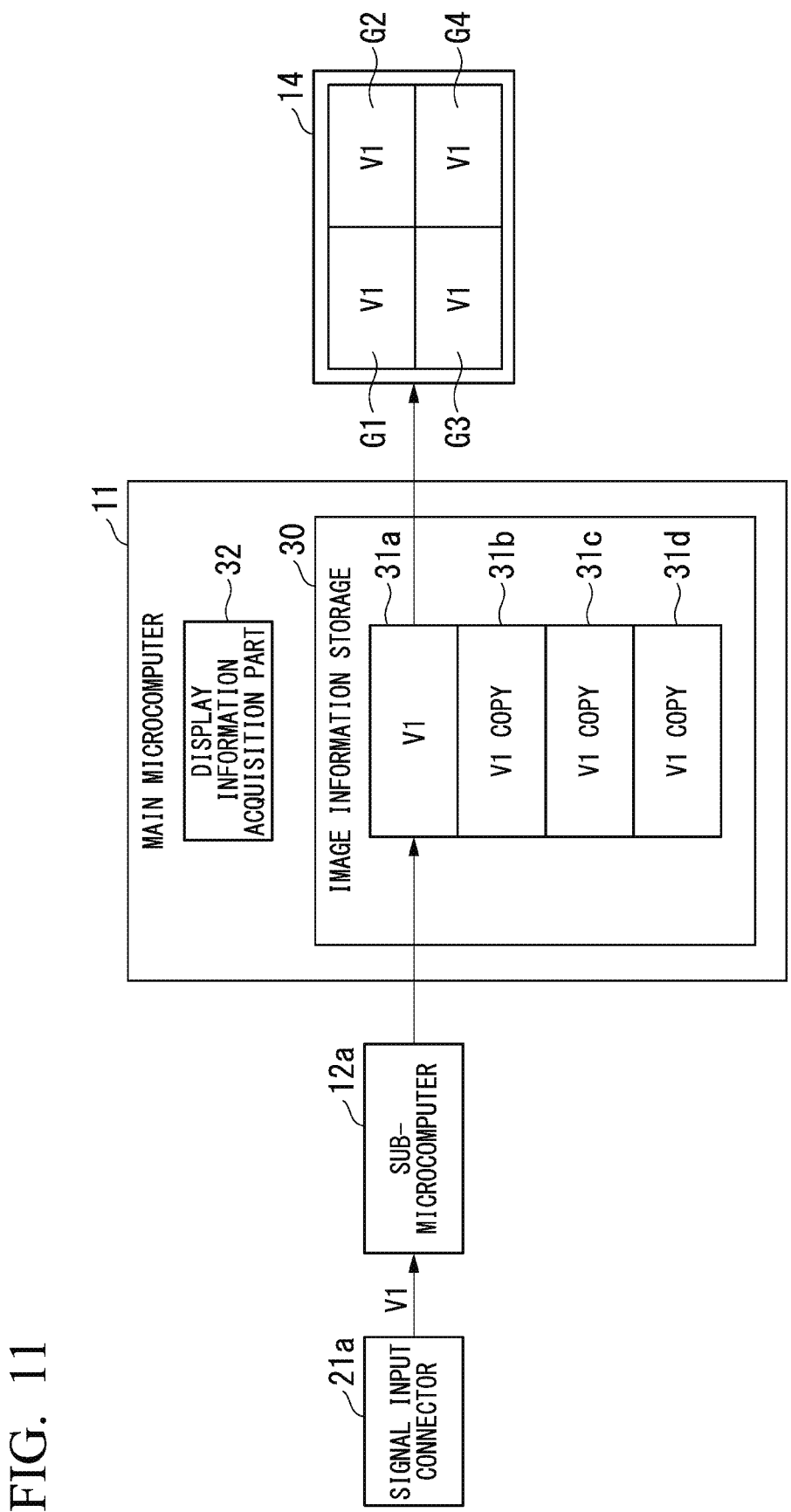
FIG. 11 is an explanatory diagram showing another example of processing of a main microcomputer.

FIG. 11 is an explanatory diagram for the processing of the main microcomputer 11 in the above example. As shown in FIG. 11, the main microcomputer 11 communicates with the sub-microcomputer 12a. The sub-microcomputer 12a carries out a reception process with the signal input connector 21a and thereby sends the timing information V1 for a video signal from the signal input connector 21a to the main microcomputer 11. The main microcomputer 11 holds the timing information V1 for a video signal from the signal input connector 21a in the screen-image holding area 31a. As explained above with reference to FIG. 7, the main microcomputer 11 copies the timing information V1 for a video signal from the signal input connector 21a, which is stored on the screen-image holding area 31a (i.e. a first screen-information holding area), to the screen-information holding areas 31b, 31c, and 31d (i.e. a screen-information holding area corresponding to another display screen). Subsequently, the main microcomputer 11 displays images, corresponding to the timing information V1 for video signals held in the screen-information holding areas 31b, 31c, and 31d, on the display screens G1, G2, G3, and G4 of the display 14.

According to the first embodiment of the present invention, the main microcomputer 11 determines whether the same input connector information is shared by multiple screens upon receiving a plurality of video signals, wherein when all the display screens share the same input connector information, the main microcomputer 11 obtains the timing information of a single video information from a sub-microcomputer subjected to a reception process to receive one of video signals. Accordingly, it is possible to reduce loads imparted to the entire system processing, and therefore it is possible to achieve a high-speed operation over the entire system.

Figure 12:
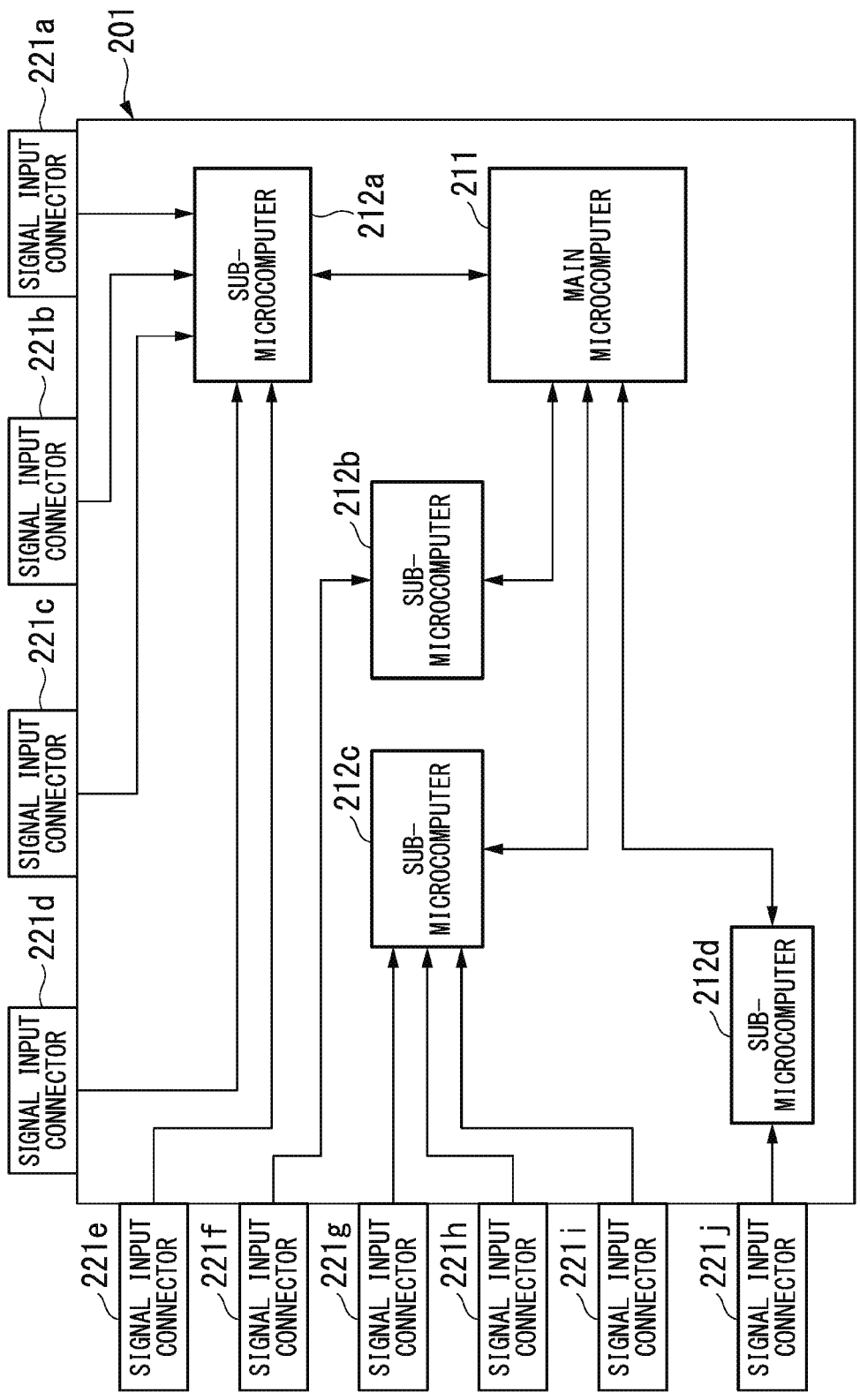
FIG. 12 is a block diagram showing the basic configuration of an image display device according to the present invention.
Figure 13:
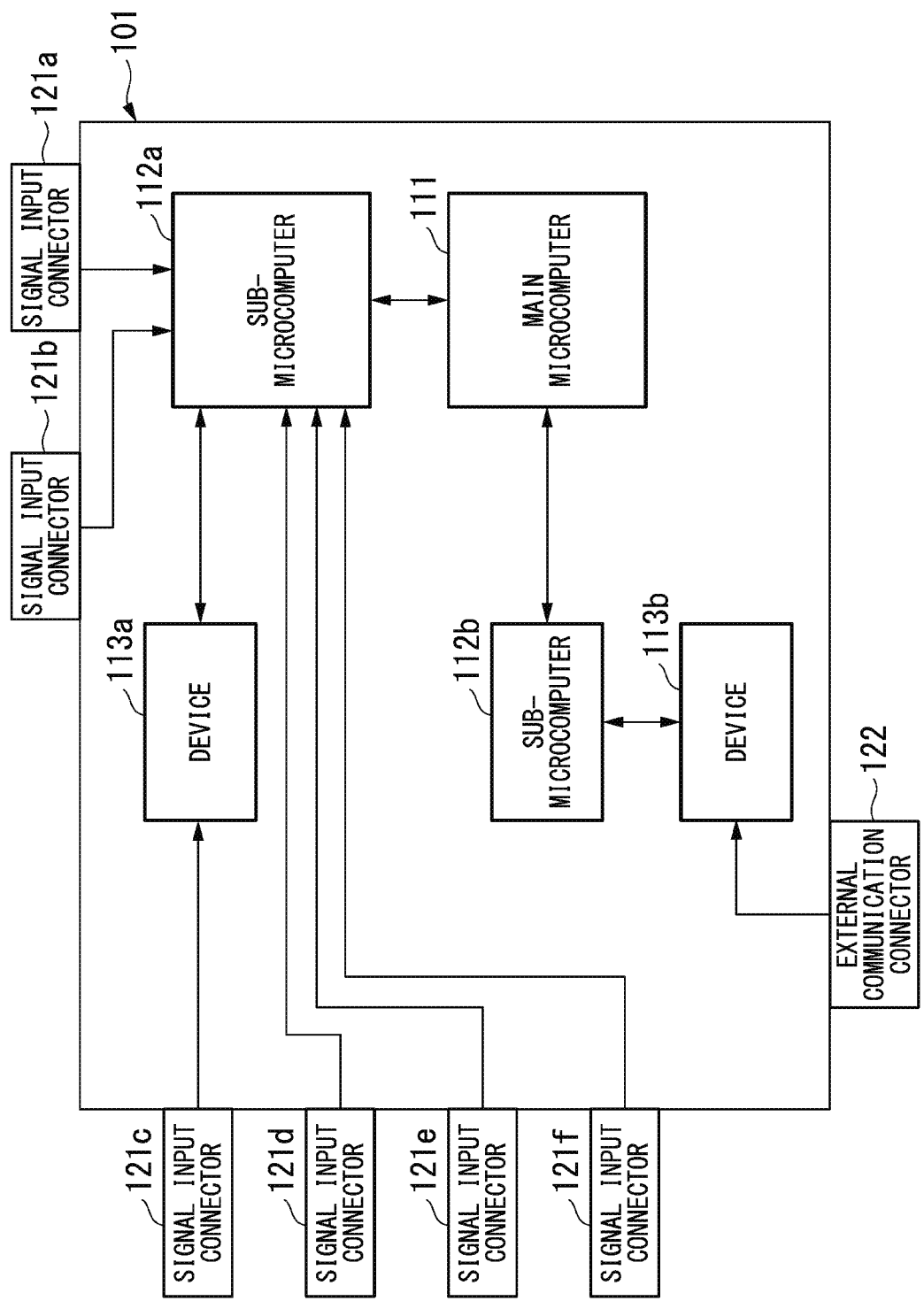
FIG. 13 is a block diagram showing an example of an image display device as a related art.

FIG. 12 is a block diagram showing the basic configuration of an image display device according to the present invention. The basic configuration of an image display device 201 is shown in FIG. 12. That is, the image display device 201 of the present invention includes a plurality of signal input connectors 221a through 221j (i.e. signal input parts), a plurality of sub-microcomputers 212a through 212d (i.e. sub-controllers) configured to process video signals from the signal input connectors 212a through 212J, and a main microcomputer 11 (i.e. a controller) configured to generate a display screen to be displayed on a display. The main microcomputer 211 obtains the timing information of a video signal from a sub-microcomputer based on the pre-installed display information.

Heretofore, the present invention has been described by way of the embodiments with reference to the drawings, however, the concrete configuration is not necessarily limited to the foregoing embodiments, and therefore the present invention may embrace any design changes without departing from the subject matter of the invention.

REFERENCE SIGNS LIST 1 image display device
11 main microcomputer
12a through 12e sub-microcomputer
13a through 13 device
14 display
21a through 21j signal input connector
22a, 22b external communication network

The invention claimed is:

1. An image display device, comprising:
a plurality of signal input parts configured to input a plurality of video signals;
a plurality of sub-controllers configured to extract a plurality of timing information associated with the plurality of video signals from the plurality of signal input parts according to a first relationship between the plurality of signal input parts and the plurality of sub-controllers; and
a controller configured to selectively generate a single display screen or a plurality of display screens to be displayed on a display according to display information representing a display screen count and a second relationship between the plurality of signal input parts and the plurality of display screens,
wherein the controller includes a plurality of screen-information holding areas configured to hold the plurality of video signals and the plurality timing information from the plurality of sub-controllers, and
wherein the controller is configured to carry out a display operation via (i) through (iii) as:
(i) selecting a signal input part from among plurality of signal input parts based on the display information in association with a display screen among the plurality of display screens according to the second relationship;
(ii) selecting a sub-controller among the plurality of sub-controllers in association with the selected signal input part according to the first relationship; and
(iii) communicating with the selected sub-controller to display a video signal of the selected sub-controller among the plurality of video signals in the display screen at the timing information extracted by the selected sub-controller.

2. The image display device according to claim 1, wherein a same signal input part among the plurality of signal input parts is shared between a first display screen and a second display screen among the plurality of display screens in association with a first screen-information holding area and a second screen-information holding area among the plurality of screen-information holding areas such that one timing information associated with the first display screen among the plurality of timing information is stored on the first screen-information holding area and is copied to the second screen-information holding area.

3. The image display device according to claim 1, wherein, before obtaining one timing information among the plurality of timing information from a desired sub-controller among the plurality of sub-controllers, the controller sends to the desired sub-controller a signal-present/absent information acquiring notification notifying whether or not a desired video signal is input to its corresponding signal input part among the plurality of signal input parts.

4. The image display device according to claim 1, wherein the display information is rewritable by an external device.

5. The image display device according to claim 1, wherein each of the plurality of timing information includes a signal status indicating whether or not to employ interlacing, vertical and horizontal frequencies, polarities of vertical and horizontal signals, a vertical position, a horizontal position, a color format, or a video format.

6. The image display device according to claim 5, wherein the color format includes NTSC 3.85 MHz, PAL, SECAM, NTSC 4.43 MHz, PAL-M, PAL-N, or PAL-60 Hz.

7. The image display device according to claim 5, wherein the video format includes 480i, 576i, 480P, 576P, 720P, 1080i, or 1080P.

8. An image processing method for an image display device comprising a plurality of signal input parts configured to input a plurality of video signals, a plurality of sub-controllers, and a controller, the image processing method comprising:
extracting by the plurality of sub-controllers a plurality of timing information associated with the plurality of video signals from the plurality of signal input parts according to a first relationship between the plurality of signal input parts and the plurality of sub-controllers;
storing, by the controller, the plurality of timing information with a plurality of screen-information holding areas;
selectively generating, by the controller, a single display screen or a plurality of display screens to be displayed on a display according to display information representing a display screen count and second relationship between the plurality of signal input parts and the plurality of display screens; and
carrying out a display operation via (i) through (iii) as:
(i) selecting a signal input part from among the plurality of signal input parts based on the display information in association with a display screen among the plurality display screens according to the second relationship;
(ii) selecting a sub-controller among the plurality of sub-controllers in association with the selected signal input part according to the first relationship; and
(iii) communicating with the selected sub-controller to display a video signal of the selected sub-controller among the plurality of video signals in the display screen at the timing information extracted by the selected sub-controller.

9. The image display device according to claim 1, wherein the plurality of signal input parts include signal input connectors, and
wherein the controller is configured to store the display information relating to a number of the display screens and the signal input connectors corresponding to each of the display screens.

10. The image display device according to claim 9, wherein the selected sub-controller is configured to receive the video signal and the timing information extracted by the selected sub-controller from the corresponding signal input connectors.

11. The image display device according to claim 10, wherein the plurality of screen-information holding areas correspond to the plurality of display screens, and
wherein the controller is configured to store video signals and the plurality of timing information associated with the plurality of video signals.

12. The image display device according to claim 11, wherein a relationship between the display screens and the signal input connectors is predetermined, and
wherein a relationship between the signal input connectors and the sub-controllers is predetermined.

13. The image display device according to claim 12, wherein the controller is configured to select the signal input connector corresponding to the display screen based on the display information and to communicate with the sub-controller correlated to the selected signal input connector for displaying the video signal on the display screen according to the timing information.

14. The image display device according to claim 1, wherein the controller selectively generates the single display screen.

15. The image display device according to claim 1, wherein the controller selectively generates the plurality of display screens.

16. The image processing method according to claim 8, further comprising:
   sharing a same signal input part among the plurality of signal input parts between a first display screen and a second display screen among the plurality of display screens in association with a first screen-information holding area and a second screen-information holding area among the plurality of screen-information holding areas such that one
   timing information associated with the first display screen amount the plurality of timing information is stored on the first screen-information holding area and is copied to
   the second screen-information holding area.

* * * * *